3,354,646
CHLORINE PENTAFLUORIDE AND METHOD
Walter Maya and Hans F. Bauer, Los Angeles, Calif., assignors to North American Aviation, Inc.
Filed Jan. 21, 1963, Ser. No. 253,521
10 Claims. (Cl. 60—211)

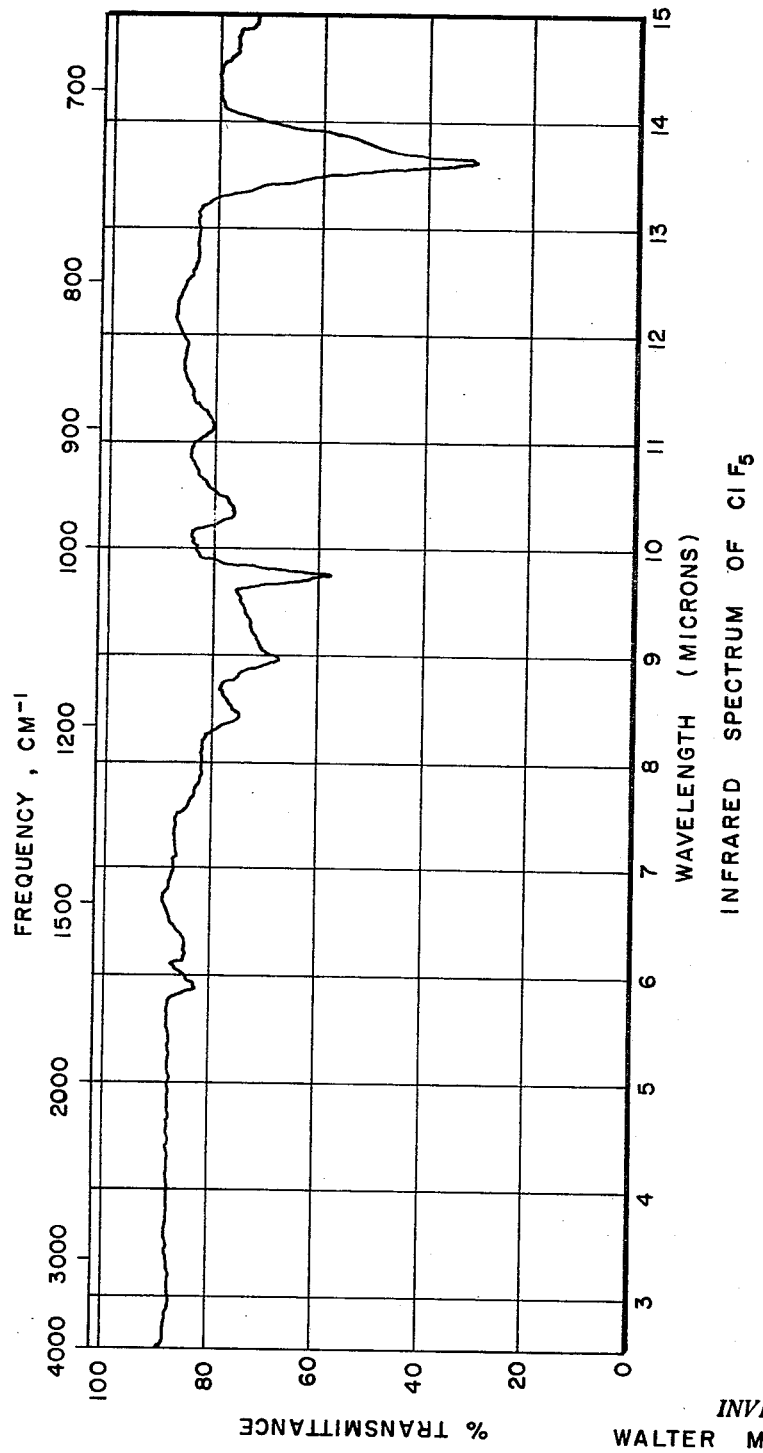
INVENTORS
WALTER MAYA
HANS F. BAUER
ATTORNEY

United States Patent Office 3,354,646
Patented Nov. 28, 1967

This invention relates to a new chemical compound, chlorine pentafluoride, and to a process for its synthesis, and to use of the compound as an oxidizer for jet propulsion engines.

The chemical formula for chlorine pentafluoride is $ClF_5$. Its boiling point is $-19°$ C. Surprisingly, it is stable to at least 300° C. in containers of Monel metal, i.e., a nickel-copper alloy, and in containers of stainless steel. Its characteristic infrared absorption spectrum is shown in the accompanying drawing as having a prominent peak at 13.6 microns, the spectrum of the drawing being the result of a test on a sample of $ClF_5$ at 0.5 mm. pressure in a cell 5 cm. long. The $F^{19}$ nuclear magnetic resonance spectrum of $ClF_5$ measured in a field of 14,092 gauss, taken in a 50 mole percent solution in $CFCl_3$ at $-20°$ C., shows a weak quintet at $-428$ p.p.m. of the field strength and a strong doublet at $-258$ p.p.m. relative to $CFCl_3$ as zero p.p.m. The coupling constant, J, is $-142$ c.p.s.

Chlorine pentafluoride, the new compound of this invention, is an extremely high-energy oxidizer of greater oxidizing potential than chlorine trifluoride which finds utility as an oxidizer for rocket propellant fuels. Chlorine pentafluoride is less corrosive to metals, glass and plastics than is chlorine trifluoride. The fact that chlorine pentafluoride has been found by this invention to be thermally stable to the extent specified above is important as revealing the new compound to be storable under standard conditions of temperature and pressure. Also, chlorine pentafluoride is useful as a fluorinating agent, e.g., for fluorinating olefins and inorganic salts.

*Synthesis of chlorine pentafluoride*

In the process of synthesizing chlorine pentafluoride according to this invention a gas containing fluorine and chlorine atoms is subjected to an electrical discharge of sufficient intensity to produce a glow of green, blue, indigo, or violet color in the gas, which discharge causes the chlorine and fluorine atoms to become electronically excited, i.e. one or more electrons of each atom pass from a normal orbit to one of higher energy or to an unbound state as a result of the absorption of radiation. While the atoms of the reactant gas are in their excited states, they become involved in numerous and simultaneous reversible reactions with compounds and elementary molecules, including $ClF_5$. The thus formed $ClF_5$ and other resultants, i.e. $ClF_3$, $ClF$, $NF_3$ and elementary molecules of fluorine, chlorine and nitrogen, are continuously withdrawn from the reaction zone, i.e. electrical discharge, and the $ClF_5$ may then be separated from the other resultants.

For the synthesis process of this invention the gas to be subjected to an electrical discharge comprises reactant molecules of at least one member of the group consisting of:

(a) A mixture of elementary fluorine and chlorine molecules ($F_2+Cl_2$);
(b) A binary compound of fluorine and chlorine, e.g. $ClF$ and $ClF_3$;
(c) A mixture of elementary fluorine and a binary compound of nitrogen and chlorine, e.g. $NCl_3$;
(d) A mixture of elementary fluorine and a binary compound of fluorine and chlorine;
(e) A mixture of elementary chlorine and a binary compound of nitrogen and fluorine, e.g. $NF_3$, $N_2F_2$, and $N_2F_4$;
(f) A mixture of elementary chlorine and a binary compound of fluorine and chlorine; and,
(g) A mixture of binary compound of nitrogen and fluorine and a binary compound of nitrogen and chlorine.

A preferred gas for use in the synthesis process of this invention is that consisting essentially of a mixture of elementary fluorine and chlorine molecules, whereby the resultant binary compounds are none other than of chlorine and fluorine, and consequently, fewer undesired resultants need be separated from the chlorine pentafluoride when it is desired to obtain pure chlorine pentafluoride.

The use of any means for producing an electrical discharge of the intensity mentioned above is contemplated by this invention. Glow discharges suitable for the synthesis of $ClF_5$ according to this invention have been produced with separate uses of direct current and alternating current power sources connected across electrodes spaced apart in a reaction cell. Also, a radio transmitter has been used successfully as a source for an electrical discharge of sufficient intensity to produce $ClF_5$. A glow of from green to violet color indicates excitation of a halogen. In the case where nitrogen atoms are present in the gas to be subjected to an electrical discharge, and a glow discharge of pink-orange color is observed, absent of any green to violet tinge, such indicates that the intensity of the electrical discharge is not great enough to excite the chlorine and fluorine atoms. If the intensity of the electrical discharge is too great, a spark or arc will develop causing immediate disintegration of any $CFl_5$ molecules which may have been formed.

In cases where the gas of the reactants either consists essentially of or comprises a binary compound of chlorine and fluorine, e.g. chlorine trifluoride, it is not essential that the atoms of all of the molecules of the exampled chlorine trifluoride become excited to a state sufficient to disintegrate the molecules into their component atoms, for, according to this invention, the atoms of some of the molecules of the chlorine trifluoride, though excited, may remain loosely linked together in a molecular pattern to which free excited atoms of fluorine may be added to form the chlorine pentafluoride.

The step of withdrawing the $ClF_5$ and other resultants from the reaction zone may be accomplished in several different ways. A suitable laboratory apparatus for synthesis of $ClF_5$ comprises a tank for containing the reactant gas, a cell connected at one end to the tank and having spaced electrodes, a fractionation train of cold traps connected to the other end of the cell, a manostat for regulating pressure in the cell, and a suction pump at the downstream end of the apparatus. The reactant gas is continuously supplied to the cell and the resultants are continuously withdrawn from the cell whereby resultants of miscellaneous concentrations are moved from the reaction zone in the cell to the fractionation train for separation.

To maintain a glow discharge on a laboratory scale, an electrode cell should be kept below 0° C. and preferably at a cryogenic temperature, i.e. $-78°$ C. and below, to prevent burning of the electrodes with fluorine acting as the oxidizer. The thus cooled walls of the cell serve to quench the reactions with $ClF_5$ and other resultants depositing on the inside surfaces of the cell walls. These deposits may be recovered by discontinuing the electrical discharge and allowing the cell to warm up to room temperature whereby the resultants pass to the fractionation train. The cell is preferably operated such that the glow extends beyond the ends of the space between the electrodes with the result that quenching of the resultants occurs on the inside surfaces of the conduits leading to and from the space between the electrodes.

The factors of pressure, electrode spacing and rate of flow of gas through the apparatus are of significance only in so far as they affect the glow discharge. A convenient electric power source for use on a laboratory scale to create a glow discharge in a cell of spaced electrodes is a 15 kv., 30 ma., luminous tube transformer. With such power source, pressures of from 2 to 85 mm., were found to be usable for operation of cells in which the electrode spacing is from 5 to 8 cm. Increased pressure causes the electrical discharge to become more concentrated, changing from a diffused glow to more of a thin continuous spark whereby the reaction zone is decreased in cross-sectional size. If the electrodes are too far apart, no discharge will be established. If the reactant gases are passed into the cell at too high a rate, they will cause the discharge to be blown out. For an electrical discharge cell having electrodes spaced apart by a distance of about 5 cm., energized by a 15 kv., 30 ma. transformer, and maintained at a pressure of about 50 mm., flow rates of gases of from about 1.5 to 3 liters per hour were found to be operable. All in all, the factors of temperature, pressure, voltage, electrode spacing, and flow rates of reactant gas, as variables which affect the efficiency of operation of the synthesis process, are of significance only when considering the particular type of electrical discharge means to be employed, and therefore, these variables are not matters of criticality in this invention.

With respect to relative concentrations of fluorine and chlorine atoms in the reactant gas, for optimum yields the concentrations of these atoms should be such that the fluorine is present at least in stoichiometrical amounts for the production of $ClF_5$, and preferably there should be an excess of fluorine. Such excess may be up to about 10 times the stoichiometrical amount of fluorine with respect to the chlorine for the formation of chlorine pentafluoride. Excesses beyond that amount are not practical because for the relative low concentration of chlorine. But from a purely qualitative standpoint, distinct from quantitative considerations, the fact of formation of $ClF_5$ exists when chlorine and fluorine atoms are excited together irrespective of their relative concentrations. As to inert constituents in the mixture of reactants, e.g. nitrogen and helium, except for the fact that nitrogen reacts with the halogens to provide undesired resultants and except for the fact that inert constituents provide ease of ionization, there are no other apparent effects on the reactions of this invention, cause by the addition of inert constituents.

The synthesis process of this invention is hereinafter illustrated in greater detail by description in connection with the following specific examples of the practice of it:

EXAMPLE I

Four liters of a mixture of 10 parts fluorine and one part chlorine was passed through an electric discharge at a pressure of 30 mm., and a flow rate of 1.5 liters per hour. The electric discharge cell consisted of a glass U-tube with copper electrodes 8 cm. apart. The discharge cell was the only component made of glass, all other parts of the system being made of stainless steel. The cell was cooled in a Dry Ice bath, and a current for the discharge was supplied by a 15 kv., 30 ma., AC luminous tube transformer. From the discharge cell, the gaseous mixture was passed into a $-196°$ C. (liquid nitrogen) trap, and the non-condensed gases were pumped off. When the 4 liters of reactant mixture had been consumed, the contents of the $-196°$ C. trap was fractionated, in a vacuum, through traps cooled to $-112°$, $-142°$, and $-196°$ C. Chlorine pentafluoride and chlorine were found in the $-142°$ C. trap. The total volume of $ClF_5$ and $Cl_2$ in the $-142°$ C. trap was about 10 cc. (STP) of which 20 percent was chlorine pentafluoride. The $-112°$ C. trap contained $ClF_3$, and the $-196°$ C. trap contained $ClF$.

EXAMPLES II–XI

The apparatus used in Example I was employed using pressures of from 2 to 85 mm., flow rates of from 1.5 to 3 liters per hour, cell cooling temperatures of from $-78°$ C to $-196°$ C., for the successful synthesis of chlorine pentafluoride from reactant mixtures as follows:

| Example No. | Reactants in Mole Ratios | | | | | |
| --- | --- | --- | --- | --- | --- | --- |
| | $F_2$ | $NF_3$ | $N_2$ | $Cl_2$ | $ClF_3$ | He |
| II | 30 | | | 1 | | |
| III | 5 | | | 1 | | |
| IV | | 4 | | 1 | | |
| V | | 3 | 1 | | | |
| VI | 3 | | 1 | | | |
| VII | | 10 | 10 | 1 | | |
| VIII | | 10 | 10 | | | |
| IX | | | | | 1 | 7 |
| X | 7 | | | | | |
| XI | 7 | | | | 4 | 5 |

With respect to Examples V, VI, VIII, and X, where no chlorine atoms were present in the prepared reactant gas mixtures, and only a very slight trace of $ClF_5$ was discovered, it was reasoned that the slight amount of chlorine atoms necessary for the synthesis of the trace of $ClF_5$ was derived from fluorine substitution of chlorine from the chlorinated stopcock grease which had been used in connecting the electrode cell to the supply tank and to the liquid nitrogen trap.

EXAMPLE XII

One tenth of a mole of nitrogen trifluoride and chlorine in a 4:1 mole ratio were passed through an all glass electrodeless glow discharge apparatus at ambient temperature and 4 mm. pressure. The excitation source, a radio transmitter, delivered ninety milliamps current at 800 volts with a radio frequency of two megacycles. Leads from spaced points on the induction coil of the transmitter were attached to two circular aluminum foil strips respectively outside the glass apparatus. These strips were placed side by side, two millimeters apart, on a straight tube and the tube was cooled by an air stream. Products from the reaction were trapped at $-196°$ C. and fractionated through several low temperature slush baths. The material passing the $-112°$ C. trap and retained by the $-126°$ C. trap was examined and found to contain chlorine, chlorine dioxide and chlorine pentafluoride. The amount of $ClF_5$ formed was estimated at 1 cc. STP. Its presence was determined by the characteristic infrared absorption at 13.6 microns.

EXAMPLE XIII

The same technique as that described in Example XII was followed with the exception that the aluminum foil strips were arranged concentrically one within and the other outside the cell tube, and $ClF_5$ was produced.

Use of $ClF_5$ as an oxidizer for fuels

As mentioned above, chlorine pentafluoride is an extremely high-energy oxidizer for combusting fuels for jet propulsion devices, e.g. a rocket motor. The details of construction and mode of operation of the various types of conventional jet propulsion devices are well-known and, in themselves form no part of this invention. A schematic diagram of a typical gas pressurized feed system on a bipropellant rocket power plant, in which the new compound of this invention is usable as a liquid oxidizer, is shown on page 187 of "Rocket Encyclopedia Illustrated" (Herrick and Burgess) published by Aero Publishers, Inc. (Los Angeles, Calif.) 1959. In operation of such rocket plant, the rocket fuel and the oxidizer are fed through separate conduits from individual storage tanks to the thrust-chamber assembly or motor of the power plant, where the stream of fuel and the stream of oxidizer contact each other from orifices in an injection plate within the reaction or combustion chamber of the motor and produce gaseous products as a result of the spontaneous combustion of the components of the two streams. The gaseous products are ejected from the combustion chamber through the throat area and then out into the atmosphere through the exit nozzle thus producing a thrust which propels a vehicle or the like.

According to this invention, the supply of liquid oxidizer for a system of the above-mentioned character may consist essentially of chlorine pentafluoride or may comprise mixtures of chlorine pentafluoride with fluorine and (or) chlorine trifluoride.

It is contemplated by this invention that any of the well-known rocket fuels may be used in conjunction with the chlorine pentafluoride oxidizer of this invention. A long list of known rocket fuels which are usable according to this invention is contained on page 178 of the "Rocket Encyclopedia Illustrated" referred to above. Examples of the more renowned rocket fuels are ammonia; hydrazine; hydrogen; a mixture of 60 percent by weight of unsymmetrical dimethyl hydrazine and 40 percent diethylenetriamine; monomethyl hydrazine; RP-1, which is a hydrocarbon fuel in accordance with specification MIL-F-25576B (USAF), and unsymmetrical dimethyl hydrazine.

It will be understood that it is intended to cover all changes and modifications of the examples of the invention herein chosen for the purpose of illustration which do not constitute departures from the spirit and scope of the invention.

Having described the invention what is claimed is:

1. A process for synthesizing chlorine pentafluoride comprising the steps of preparing a supply of reactant gas having elemental molecules of fluorine and chlorine; subjecting the gas to an electrical discharge of an intensity sufficient to produce a glow in the gas, the glow having a wavelength at least as short as that of green light, thereby exciting the atoms of said fluorine and chlorine, whereby the excited atoms react with one another to form chlorine pentafluoride; withdrawing the chlorine pentafluoride from said discharge, and collecting the chlorine pentafluoride.

2. The process of claim 1 in which said discharge is that produced by impressing a voltage across two spaced electrodes.

3. The process of claim 1 in which said discharge is that produced by a radio transmitter.

4. A process for synthesizing chlorine pentafluoride comprising the steps of preparing a gas comprising reactant molecules of at least one member of the group consisting of a mixture of elementary fluorine and chlorine, a binary compound of fluorine and chlorine, a mixture of elementary fluorine and a binary compound of nitrogen and chlorine, a mixture of elementary fluorine and a binary compound of fluorine and chlorine, a mixture of elementary chlorine and the binary compound of nitrogen and fluorine, a mixture of elementary chlorine and a binary compound of fluorine and chlorine, and a mixture of a binary compound of nitrogen and fluorine and a binary compound of nitrogen and chlorine; subjecting said gas to an electrical discharge of an intensity sufficient to produce a glow in the gas, the glow having a wavelength at least as short as that of green light, thereby exciting the chlorine and fluorine atoms of said reactant molecules, whereby the excited atoms react with one another to form chlorine pentafluoride; withdrawing the chlorine pentafluoride from said discharge, and collecting the chlorine pentafluoride.

5. The process of claim 4 on which resultants other than chlorine pentafluoride are formed, and the process, comprising the step of separating the chlorine pentafluoride from said other resultants.

6. The process of claim 4 in which said chlorine pentafluoride is collected in a container formed of a member of the group consisting of a nickel-copper alloy and stainless steel.

7. The process of claim 4 in which said gas consists essentially of elementary molecules of fluorine and chlorine with the fluorine being present in an amount of from 1 to 10 times the stoichiometrical amount of fluorine with respect to the chlorine for the formation of chlorine pentafluorine.

8. The method of producing thrust in a jet propulsion engine comprising the steps of injecting into a combustion chamber of the engine a liquid rocket fuel and a liquid oxidizer comprising chlorine pentafluoride, combusting the fuel and the oxidizer in said chamber and ejecting the combustion products to produce usable thrust.

9. A method of effecting combustion in a reaction chamber comprising contacting in said chamber an oxidizer comprising chlorine pentafluoride with a rocket fuel.

10. The compound chlorine pentafluoride.

References Cited

UNITED STATES PATENTS

| | | | |
|---|---|---|---|
| 2,904,403 | 9/1959 | Smith | 23—205 |
| 3,097,067 | 7/1963 | Fawcett et al. | 23—205 |
| 3,048,966 | 8/1962 | Feraud et al. | 60—35.4 |
| 3,071,923 | 1/1963 | D'alelio | 60—35.4 |
| 2,904,403 | 9/1959 | Smith | 23—205 |
| 2,938,833 | 5/1960 | Kolfenbach Et al. | 60—35.4 |
| 3,091,581 | 5/1963 | Barr et al. | 204—193.2 |
| 3,167,908 | 2/1965 | Dale. | |

OTHER REFERENCES

Martinez et al.: "Study of Superoxidizers," Air Force Office of Scientific Research, Technical Report—AFOSR/DRA-61-7, December 1961, p. 43.

Gall: "Recent Advances in Fluorine Chemistry and Technology" Arts Journal, February 1959, pp. 95–101.

Emeleus et al: "Advances in Inorganic Chemistry and Radiochemistry" vol. 3, 1961, Academic Press, New York, pp. 136–139.

The Condensed Chemical Dictionary, Rheinhold Pub. Corp., New York, 1956, pp. 737 and 1031.

Ruff et al.: Z. Anorg u. Allegem. Chem., vol. 202, pp. 49 and 50 (1931).

L. DEWAYNE RUTLEDGE, *Primary Examiner.*

REUBEN EPSTEIN, CARL D. QUARFORTH, BENJAMIN R. PADGETT, *Examiners.*

L. A. SEBASTIAN, J. D. VOIGHT, *Assistant Examiners.*